UNITED STATES PATENT OFFICE.

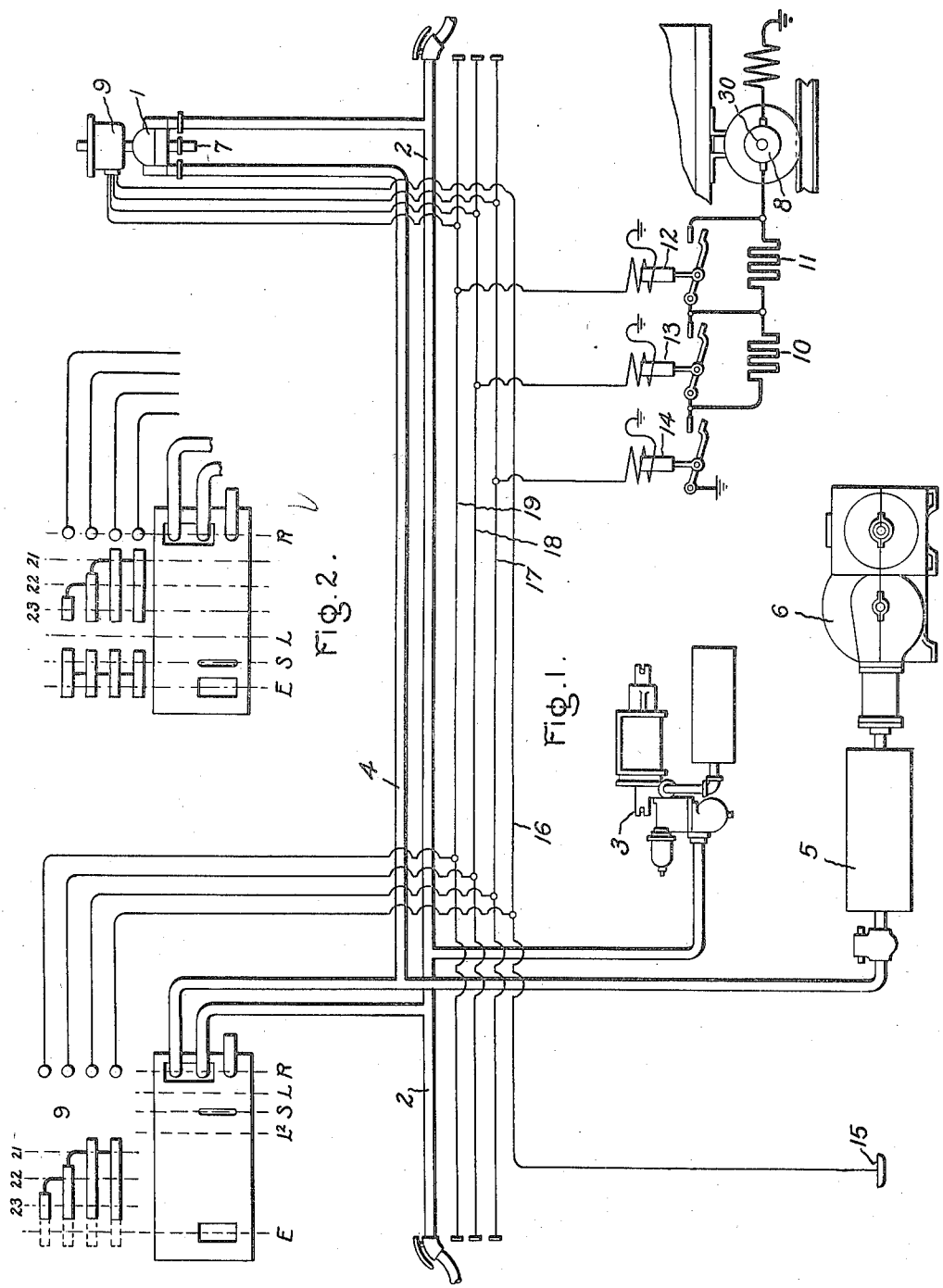

ASA F. BATCHELDER, OF GLENVILLE, NEW YORK, ASSIGNOR TO GENERAL ELECTRIC COMPANY, A CORPORATION OF NEW YORK.

BRAKING SYSTEM.

1,248,439.     Specification of Letters Patent.     Patented Dec. 4, 1917.

Application filed March 5, 1914. Serial No. 822,570.

*To all whom it may concern:*

Be it known that I, ASA F. BATCHELDER, a citizen of the United States, residing at Glenville, county of Schenectady, State of New York, have invented certain new and useful Improvements in Braking Systems, of which the following is a specification.

Among the difficulties encountered in the operation of high speed trains making frequent stops, the operation of trains on long or frequent hills, and elsewhere, are the excessive wear on the brake shoes produced by the excessive braking that is necessary under the present operating conditions, and from the standpoint of the public at least, the noise and brake shoe dust. These latter difficulties become really serious in the operation of trains underground. One of the objects of my invention is to overcome these difficulties in great measure and I do this by combining electric braking without brake shoes with the usual air brakes. The electric braking is obtained through a dynamo electric machine attached to a car axle which, when braking, operates as a generator driven by the momentum of the car. Energy is thus taken from the moving vehicle with minimum noise, and with a minimum production of dust and mechanical wear; the braking is of course, in proportion to the load on the generator and this may be varied to vary the braking force. On electrically driven cars one or more of the driving motors may be utilized as the braking generator or generators.

Now such braking generators are not adapted to bring a car to a complete stop satisfactorily although they can exert great retarding action when the car has considerable headway; the braking force decreases rapidly with the decrease in speed and amounts to little when the car is moving slowly. Therefore, I combine the usual pneumatic braking and the electric braking, in general slowing down the vehicle by the electric brakes and completing the stop with the pneumatic brakes; the pneumatic brakes are also adapted to secure emergency operation in the usual manner. Since the electric braking is almost entirely free of the enumerated difficulties inherent in pneumatically applied brake shoes, these difficulties may be reduced to a minimum by using brake shoe braking only to such an extent as the electric braking needs to be supplemented.

There is still another advantage to be derived from the combination of these brakes. Pneumatic brakes, and all other brakes operating through brake shoes, are less effective at high speeds than at low speeds with the same pressure exerted; that is the force resisting the progress of the train is somewhat less at high than at low speed. The electric braking on the other hand exerts a greater resistive force at high speeds than at low speeds. By combining these two braking means, their effects being properly proportioned relatively to each other, approximately any desired relation between the total braking force and the speed may be obtained, that is a braking force decreasing at a given rate with decrease of speed, constant with decrease of speed or even increasing with decrease of speed if desired.

The accompanying drawing forms a part of this specification: Figure 1 illustrates diagrammatically a simple braking system involving my invention. Fig. 2 is the development of another valve and controller arrangement for the system illustrated in Fig. 1.

In Fig. 1 a common form of automatic air brake system is shown. 1 is the motorman's valve, 2 the train pipe, 3 the triple valve, auxiliary reservoir and brake cylinder, and 4 the reservoir pipe between the main reservoir 5, which is supplied by the air compressor 6, and the motorman's valve. At the left of the figure the motorman's valve is shown developed. There are the four usual positions for the motorman's valve, release R, lap L, service S, and emergency E; in the first of these positions the reservoir pipe 4 is connected to the train pipe 2 and the exhaust port 7 of the motorman's valve is blanked. In the second or lap position the ports are blanked. In the third or service position S the main reservoir pipe 4 is blanked, while the train pipe 2 is connected to the exhaust 7 through a small opening, thus allowing the air to escape slowly from the train pipe 2 to produce the usual service application of the brakes. In the emergency position E the train pipe 2 is connected to the exhaust 7 through a large opening, allowing the quick release of pressure in the train pipe, the main reservoir pipe being blanked. Between the service position S and the emergency position E, the motorman's valve handle may be rotated through a number of degrees without affecting the pneumatic braking for the purpose of controlling the electric braking as will be later described. It will be understood that the specific form of the air brake apparatus is not particularly material to my invention and that I have illustrated and described this particular air brake apparatus since it is simple and serves as well as any other to illustrate my invention.

The braking generator 8 is a series dynamo electric machine, the rotatable member of which is attached to an axle 30 of the vehicle to which this braking system is attached. This machine may be one of the driving motors of a car, should the car be electrically driven. The control system for controlling this machine when acting as a motor has not been illustrated since it does not affect this invention, it being understood that the machine may be entirely disconnected from the source of energy and that the armature and field windings are connected in the proper direction for operation as a generator, prior to or at the time that it is required to act as a part of the braking system. The controller 9 for the electric brake is attached to the motorman's valve in this system; this is the preferable construction. The controller is shown developed at the left of the figure. The controller governs the operation of the machine 8 as a generator and the load through which the machine must operate; I have illustrated the generator 9 as connected to operate through three degrees of load. A resistance member is divided into two parts 10 and 11 and in shunt with each part is an electro-magnetically operated contactor 12 and 13 respectively. One end of the resistance is attached to one brush of the machine 8 as illustrated, and the other end of the resistance may be grounded by the electro-magnetically operated contactor 14. The other side of the machine 8 is grounded. Energy for operating the contactors may be supplied in any suitable way as through the shoe 15 which runs on the third rail supplying energy for driving the car. The wire 16 carries this energy through the car and to a finger on each controller 9. The wires 17, 18 and 19 are directly connected to the solenoids of the contactors 14, 13 and 12 respectively, the other sides of the solenoids being connected to ground. Each of these wires is likewise carried to a finger on each of the controllers 9. Each controller is provided with contacts to engage with the respective fingers as required, and each controller has three operating steps corresponding to the three degrees of load which may be imposed on the machine 8 acting as a generator. These three steps of the controller, in the system illustrated in Fig. 1, are located between the service position S and the emergency position E of the motorman's valve and are preferably preceded by a lap position $L^2$ when all the ports of the pneumatic system are blanked and the local circuit through the machine is open. If desired the contacts on the controllers 9 may be continued to the emergency position E of the motorman's valve as indicated in dotted lines, in which case the generator aids in stopping the car not only on a service application of the brakes but also on an emergency application through the motorman's handle.

The operation of this system is as follows: With the motorman's valve in the release position as shown, the train pipe and connected apparatus are charged with air and the brake shoes released. As the motorman's valve is moved to service position S, the brake shoes are applied with a pressure depending on the size of the passage between the train pipe 2 and the exhaust 7 and the length of time the motorman maintains his valve in this position. Ordinarily he may admit but a few pounds pressure to the brake cylinder. The motorman then continues rotating his valve handle, passing to the second lap position $L^2$, and if he requires more braking force, as he will normally, he continues to the electric braking position 21, 22 or 23 as required. The total effort on the car is then the sum of the effort of the air brakes and the effort required to drive the machine 8. On position 21 the contactor 14 is closed and the machine 8 driven by the vehicle acts as a generator through the total resistances 10 and 11. On position 22 of the controller 9, contactors 13 and 14 are closed, the first of these shunting resistance 10 requiring the machine 8 to operate only through the resistance 11, thus increasing its braking effect. On position 23 the total resistances 10 and 11 are cut out and the generator operates on substantially short-circuit giving its maximum braking effect. While the speed of the car is high, the braking effect of the machine 8 is great, but as its speed becomes less, the braking effect of the machine 8 becomes less, but the air brakes already applied are sufficient to complete the stop of the car within a reasonable distance. Also as pointed out before the braking effort of the air brakes increases with the decrease in speed and the braking effort of the machine 8 decreases with the decrease in speed. Thus by properly proportioning the braking efforts of these two sides of the system, any resultant braking characteristic desired may be obtained.

On an emergency application of the brakes, the air brakes are applied with the emergency pressure, as heretofore, and they may or may not be aided by the electric braking, dependent upon whether the contacts of the motorman's controllers are carried to the emergency position, as shown in dotted lines in Fig. 1 or not.

The operation of the two sides of the system may take place at other relative times, as may best suit the particular case in hand, without departing from my invention. For example, another relation between the two sides is shown in Fig. 2; here R, L, S and E are respectively the release, lap, service and emergency positions of the motorman's valve. But in this case the electric side of the system operates prior to the application of the brake shoes by the pneumatic side of the system. With this arrangement of controller and motorman's valve, the motorman may first reduce the speed of his car very materially by means of the electric braking alone and only apply the air brakes when it is necessary to supplement the electric brake. The electric braking is here illustrated as continued through the service and emergency positions of the motorman's valve.

While I prefer that the controllers 9 be attached to operate with the respective motorman's valves 1, this is not a requisite of my invention.

The structure and operation of the system may of course be greatly changed without departing from the spirit of my invention which is defined in the following claims.

What I claim as new and desire to secure by Letters Patent of the United States is:—

1. On a vehicle, the combination with an air brake system, of a dynamo electric machine the rotatable member of which is operatively associated with a wheel of the vehicle, means for utilizing the dynamo electric machine for braking and a controller for such means mechanically connected to the engineer's brake valve to operate therewith.

2. On a vehicle, the combination with an air brake system, of a dynamo electric machine the rotatable member of which is operatively associated with a wheel of the vehicle, means for utilizing the dynamo electric machine for braking and a controller for such means mechanically connected to the engineer's brake valve to operate therewith so that in stopping the vehicle the dynamo electric machine may be utilized to decrease its speed and the air brake may complete the stop.

3. On a vehicle, the combination with an air brake system operable for braking the vehicle in the usual manner, of a dynamo-electric machine the rotatable member of which is operatively associated with a wheel of the vehicle, means for electrically braking the vehicle without brake shoes by connecting said dynamo-electric machine as a braking generator, and a controller for such means operable to vary the braking force of said machine independently of the variation of the braking force of the air brakes.

4. On a vehicle, the combination with an air brake system, of a dynamo electric machine the rotatable member of which is operatively associated with a wheel of the vehicle, variable means for loading the dynamo-electric machine as a generator to make it to act as a brake for the wheel with which it is associated and a controller for such means mechanically connected to the engineer's brake valve to operate therewith.

5. On a vehicle, the combination with an air brake system, of a dynamo electric machine the rotatable member of which is operatively associated with a wheel of the vehicle, variable means for loading the dynamo electric machine as a generator to make it to act as a brake for the wheel with which it is associated and a controller for such means mechanically connected to the engineer's brake valve to operate therewith so that in stopping the vehicle the dynamo electric machine may be utilized to decrease its speed and the air brake may complete the stop.

6. On a vehicle, the combination with an air brake system, of a dynamo-electric machine the rotatable member of which is operatively associated with a wheel of the vehicle, means for electrically braking the vehicle without brake shoes by connecting said dynamo-electric machine as a short circuited braking generator, and a controller for varying the resistance of said short circuit, the two braking systems being adapted to coöperate in braking the vehicle.

7. On an electrically driven car, the combination with an air brake system, of means for electrically braking the vehicle without brake shoes by connecting the motor of said car as a short circuited braking generator, and a controller for varying the resistance of said short circuit operable independently of the variation of the braking force of the air brakes.

8. On an electrically driven car, the combination with an air brake system, of means for closing a local circuit through a driving motor of the car and for varying the amount of resistance in said local circuit, and a controller for said means operating with the engineer's brake valve.

9. On a vehicle, the combination with an air brake system operable for braking the vehicle in the usual manner, of a dynamo-electric machine the rotatable member of which is operatively associated with a wheel of the vehicle, means for electrically braking the vehicle without brake shoes by connecting said dynamo-electric machine as a braking generator, a resistance for controlling the value of the load on said braking generator, and a controller operable to vary the amount of said resistance effective on the load on said braking generator independently of the variation of the braking force of the air brakes.

In witness whereof, I have hereunto set my hand this 3rd day of March, 1914.

ASA F. BATCHELDER.

Witnesses:
 BENJAMIN B. HULL,
 BEVIS P. COULSON, Jr.